US011515825B2

(12) United States Patent
Jadric et al.

(10) Patent No.: US 11,515,825 B2
(45) Date of Patent: Nov. 29, 2022

(54) SYSTEMS AND METHODS FOR A DUAL-SUPPLY VARIABLE SPEED DRIVE (71) Applicant: Johnson Controls Technology Company, Auburn Hills, MI (US)

(72) Inventors: Ivan Jadric, York, PA (US); Ajit Wasant Kane, York, PA (US); Scott Victor Slothower, Dillsburg, PA (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 243 days.

(21) Appl. No.: 16/755,109

(22) PCT Filed: Oct. 10, 2018

(86) PCT No.: PCT/US2018/055269
§ 371 (c)(1),
(2) Date: Apr. 9, 2020

(87) PCT Pub. No.: WO2019/075104
PCT Pub. Date: Apr. 18, 2019

(65) Prior Publication Data
US 2020/0244208 A1 Jul. 30, 2020

Related U.S. Application Data (60) Provisional application No. 62/570,522, filed on Oct. 10, 2017.

(51) Int. Cl.
*H02P 27/08* (2006.01)
*F25B 31/02* (2006.01)
(52) U.S. Cl.
CPC ............ *H02P 27/08* (2013.01); *F25B 31/026* (2013.01); *H02P 2207/07* (2013.01)

(58) Field of Classification Search
CPC .................. H02P 27/08; F25B 31/026
(Continued)

(56) References Cited

U.S. PATENT DOCUMENTS 4,392,099 A 7/1983 Kuniyoshi
6,242,884 B1 6/2001 Lipo et al.
(Continued)

FOREIGN PATENT DOCUMENTS

JP H01321896 A 12/1989
JP H04208098 A 7/1992
(Continued)

OTHER PUBLICATIONS

International Search Report and Written Opinion for PCT Application No. PCT/US2018/055269, dated Dec. 11, 2018, 16 pgs.
(Continued)

*Primary Examiner* — Erick D Glass
(74) *Attorney, Agent, or Firm* — Fletcher Yoder, P.C.

(57) ABSTRACT

In an embodiment of the present disclosure, a heating, ventilation, air conditioning, and refrigeration (HVAC&R) system includes a refrigerant loop and a compressor disposed along the refrigerant loop. The compressor is configured to circulate refrigerant through the refrigerant loop. The HVAC&R system also includes a motor configured to drive the compressor and a variable speed drive (VSD) configured to supply power to the motor. The VSD further includes a first power pod configured to supply a first power to the motor and a second power pod configured to supply a second power to the motor.

18 Claims, 5 Drawing Sheets (58) Field of Classification Search
USPC .................................................. 165/104.31
See application file for complete search history.

(56) References Cited

U.S. PATENT DOCUMENTS

| | | | |
|---|---|---|---|
| 9,906,183 B1* | 2/2018 | Agirman | H02P 27/08 |
| 2006/0208685 A1* | 9/2006 | Schnetzka | H02M 1/36 |
| | | | 318/800 |
| 2010/0083692 A1 | 4/2010 | Todd et al. | |
| 2014/0146584 A1* | 5/2014 | Swamy | H02M 7/06 |
| | | | 363/64 |
| 2017/0085205 A1 | 3/2017 | Koseki et al. | |
| 2018/0251036 A1* | 9/2018 | Tapadia | H02M 1/12 |
| 2019/0009920 A1* | 1/2019 | Armstrong | H02J 3/12 |

FOREIGN PATENT DOCUMENTS

| | | |
|---|---|---|
| JP | H05146195 A | 6/1993 |
| JP | H05199798 A | 8/1993 |
| JP | H05252794 A | 9/1993 |
| JP | H08280192 A | 10/1996 |
| JP | H10225181 A | 8/1998 |
| JP | 2000324892 A | 11/2000 |
| JP | 2010104189 A | 5/2010 |
| JP | 2012025373 A | 2/2012 |
| JP | 2013151206 A | 8/2013 |
| JP | 2013219869 A | 10/2013 |
| JP | 2014516240 A | 7/2014 |
| JP | 2014165957 A | 9/2014 |
| JP | 2016096709 A | 5/2016 |
| JP | 2016116447 A | 6/2016 |
| JP | 2016152682 A | 8/2016 |
| JP | 2017017898 A | 1/2017 |
| KR | 20060116868 A | 11/2006 |
| KR | 101361455 B1 | 2/2014 |
| KR | 20160032199 A | 3/2016 |
| WO | 2014192130 A1 | 12/2014 |
| WO | 2016135840 A1 | 9/2016 |

OTHER PUBLICATIONS

Munoz-Garcia et al., Dual Stator Winding Induction Machine Drive, IEEE Transactions on Industry Applications, Sep.-Oct. 2000, 11 pgs, vol. 36, No. 5.
Besselmann et al., Model Predictive Control in the Multi-Megawatt Range, IEEE Transactions on Industrial Electronics, Jul. 2016, 8 pgs, vol. 63, No. 7.
Japanese Office Action for JP Application No. 2020-520501, dated Jul. 9, 2021, 8 pgs.
Korean Office Action for KR Application No. 10-2020-7013003, dated Jul. 23, 2021, 9 pgs.
European Office Action for EP Application No. 18796240.2, dated Nov. 23, 2021, 7 pgs.
Japanese Office Action for JP Application No. 2020-520501, dated Feb. 1, 2022, 8 pgs.
Japanese Office Action for JP Application No. 2020-520501, dated Sep. 1, 2022, 7 pages.
Korean Office Action for KR Application No. 10-2020-7013003, dated Aug. 30, 2022, 4 pages.
Taiwan Office Action and Search Report for TW Application No. 107135850, dated Aug. 23, 2022, 7 pages.

* cited by examiner

SYSTEMS AND METHODS FOR A DUAL-SUPPLY VARIABLE SPEED DRIVE

CROSS-REFERENCE TO RELATED APPLICATIONS

This application is a U.S. National Stage Application of PCT International Application No. PCT/US2018/055269, entitled "SYSTEMS AND METHODS FOR A DUAL-SUPPLY VARIABLE SPEED DRIVE," filed Oct. 10, 2018, which claims priority from and the benefit of U.S. Provisional Application Ser. No. 62/570,522, entitled "SYSTEMS AND METHODS FOR A DUAL-SUPPLY VARIABLE SPEED DRIVE," filed Oct. 10, 2017, which are hereby incorporated by reference in their entireties for all purposes.

BACKGROUND

This application relates generally to a variable speed drive for use with a dual-winding motor.

Chiller systems, or vapor compression systems, utilize a working fluid, typically referred to as a refrigerant that changes phases between vapor, liquid, and combinations thereof in response to being subjected to different temperatures and pressures associated with operation of the vapor compression system. In some chiller systems, a variable speed drive (VSD) may supply power to a motor to drive one or more components of the chiller system. However, a traditional VSD may be inefficient with regard to production and operation costs when utilized with chiller systems that call for high-output motors.

SUMMARY

In an embodiment of the present disclosure, a heating, ventilation, air conditioning, and refrigeration (HVAC&R) system includes a refrigerant loop and a compressor disposed along the refrigerant loop. The compressor is configured to circulate refrigerant through the refrigerant loop. The HVAC&R system also includes a motor configured to drive the compressor and a variable speed drive (VSD) configured to supply power to the motor. The VSD further includes a first power pod configured to supply a first power to the motor and a second power pod configured to supply a second power to the motor.

In another embodiment of the present disclosure, a method includes receiving a set of electrical signals via a first power pod of a variable speed drive, receiving the set of electrical signals via a second power pod of the variable speed drive, supplying a first voltage to first windings of a motor via the first power pod, and supplying a second voltage to second windings of the motor via the second power pod. The first and second power pods are configured to operate independently of one another.

In another embodiment of the present disclosure, a system includes a microcontroller, a variable speed drive (VSD) configured to receive a set of electrical signals from the microcontroller, and a motor configured to receive a first power supply and a second power supply from the VSD via first and second windings, respectively. The first and second windings are electrically insulated from one another.

DETAILED DESCRIPTION

Embodiments of the present disclosure include a variable speed drive system that may save in production and operation costs of a heating, ventilation, air conditioning, and refrigeration (HVAC&R) system. For example, a motor may drive one or more operations of certain HVAC&R systems. The motor may be powered by a variable speed drive (VSD). However, certain HVAC&R systems may utilize larger motors which may also utilize higher currents. To this end, the VSD may utilize large components, such as wires and inductors, to supply the higher currents to the motor. However, VSDs that utilize such large components may be impractical to manufacture and/or operate and incur excessive production/maintenance costs. Accordingly, the presently-disclosed embodiments may utilize a VSD having two power pods, or two separate supplies of power, to feed two electrically isolated windings of a motor. In certain embodiments, the VSD may be used with an existing motor having two electrically isolated windings. For example, present embodiments of the VSD may be used in retrofit applications to provide power to existing motors.

In accordance with present embodiments, the two power pods may each be rated to supply half of the power utilized by the motor. Therefore, due to the lower power output of each power pod, the VSD may include suitably sized, easy to work with, components, thereby saving in production and other costs. Further, by virtue of the duplicity of the system, if one of the power pods stops supplying power, the other power pod may continue to supply power to the motor, thereby enabling the HVAC&R system to continue operation. In this manner, costs associated with systems halting production may be reduced.

Figure 1:
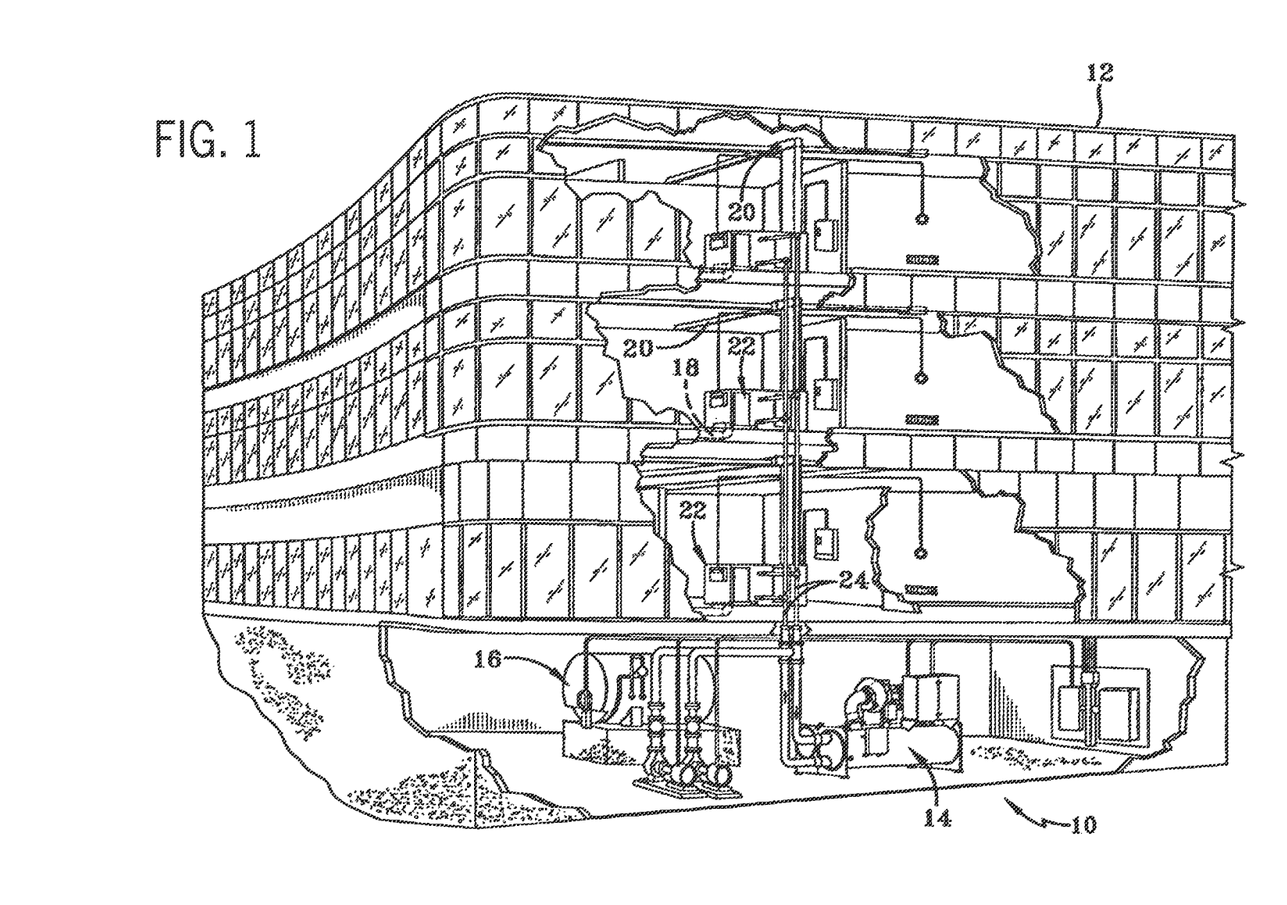
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
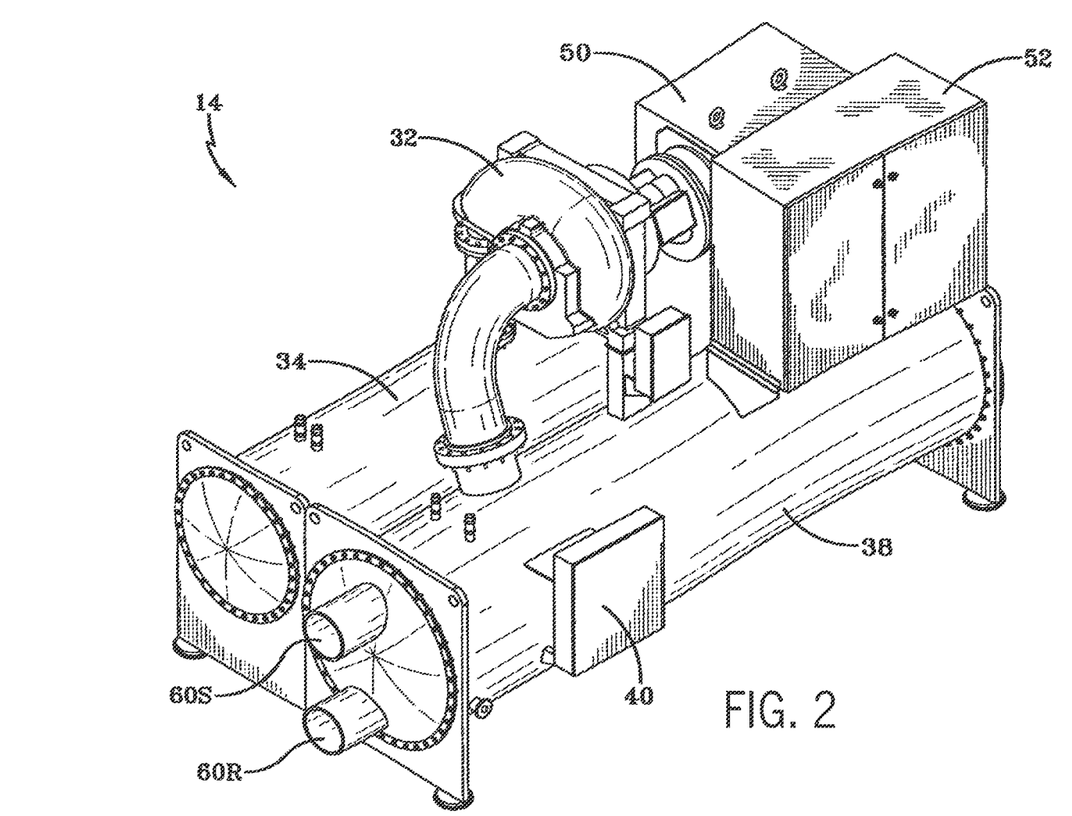
FIG. 2 is a perspective view of an embodiment of an HVAC&R system, in accordance with an aspect of the present disclosure.
Figure 3:
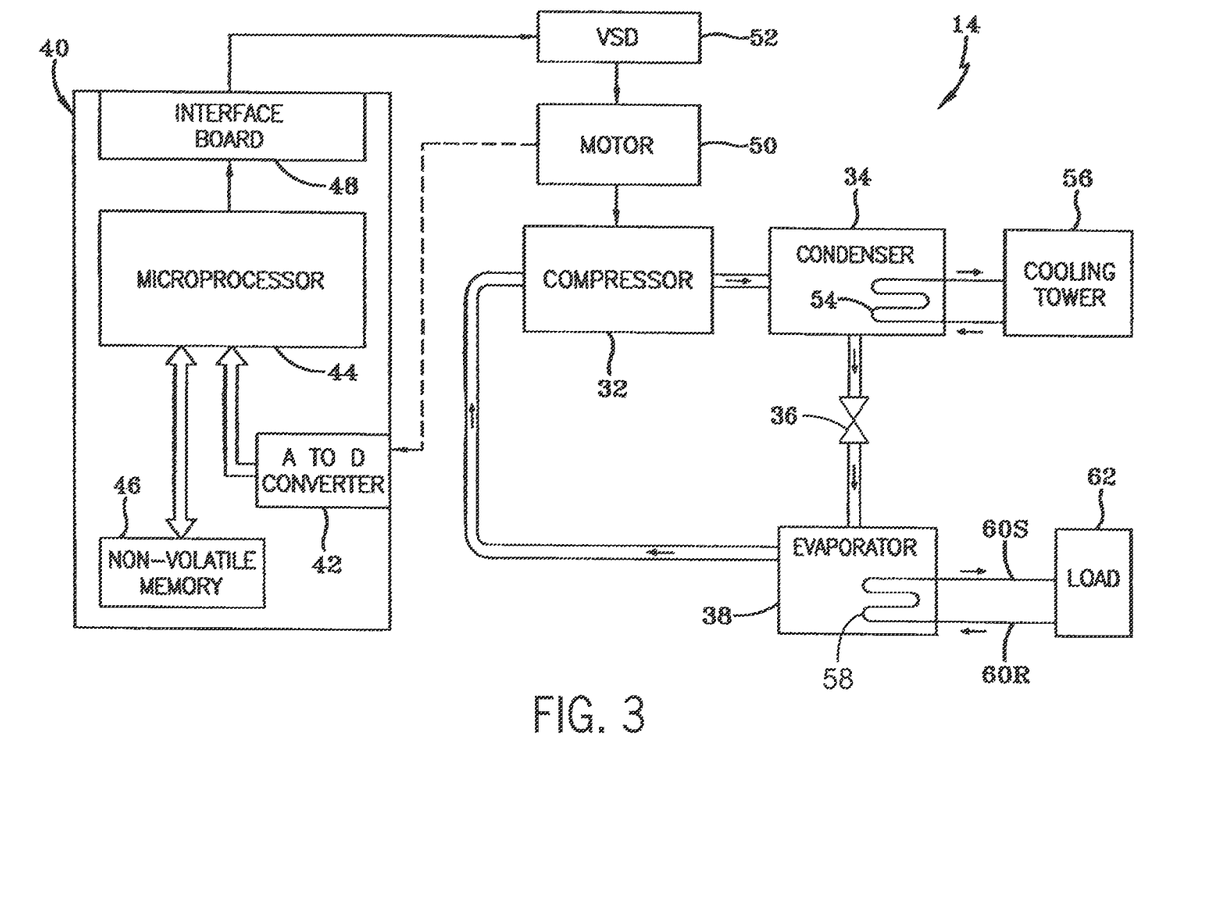
FIG. 3 is a schematic of an embodiment of the HVAC&R system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 (e.g., controller) that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro-olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit or less) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The refrigerant liquid from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The refrigerant liquid delivered to the evaporator 38 may absorb heat from another cooling fluid, which may or may not be the same cooling fluid used in the condenser 34. The refrigerant liquid in the evaporator 38 may undergo a phase change from the refrigerant liquid to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the refrigerant vapor exits the evaporator 38 and returns to the compressor 32 by a suction line to complete the cycle.

Figure 4:
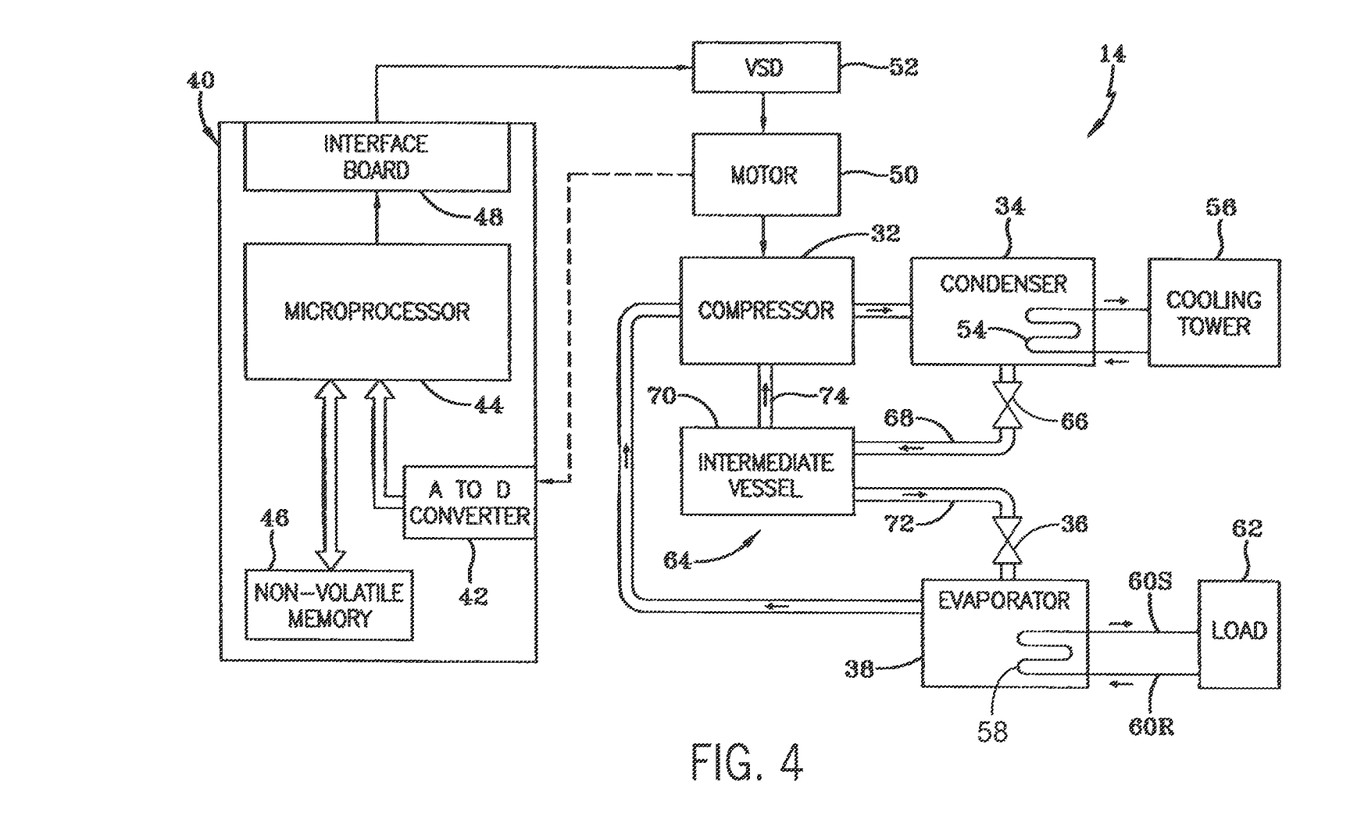
FIG. 4 is a schematic of an embodiment of the HVAC&R system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the refrigerant liquid received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the refrigerant liquid because of a pressure drop experienced by the refrigerant liquid when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the refrigerant liquid exiting the condenser 34 because of the expansion in the expansion device 66 and/or the intermediate vessel 70. The liquid from intermediate vessel 70 may then flow in line 72 through a second expansion device 36 to the evaporator 38.

Figure 5:
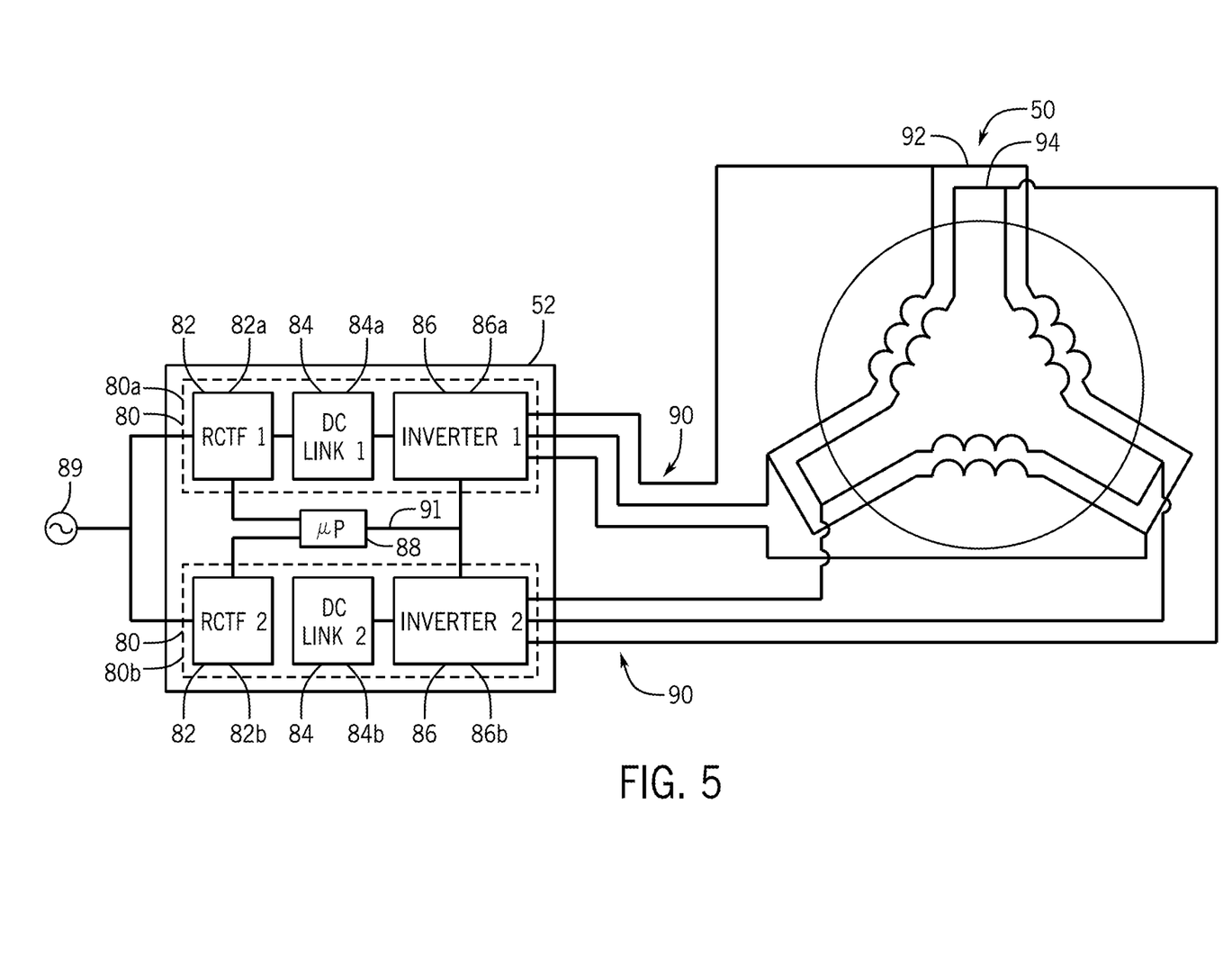
FIG. 5 is a schematic of an embodiment of a motor in communication with a variable speed drive (VSD) of the HVAC&R system of FIG. 2, in accordance with an aspect of the present disclosure.

In some embodiments, the motor 50 may be rated for a high output, such as greater than 1300 horsepower. Accordingly, the VSD 52 may include two power pods, which may each supply half of the power for the motor 50. In this manner, the VSD 52 may continue to supply some amount of power to the motor 50 in an instance where one of the power pods discontinues its supply of power. Further, because the VSD 52 includes two power pods that each provide half of the power for the motor 50, the wires and other components (e.g., inductors) associated with the VSD 52 may remain at manageable sizes despite the higher power demand from the motor 50.

For example, as illustrated in FIG. 5, the VSD 52 may provide power to the motor 50 via power pods 80, and more specifically, via a first power pod 80a and a second power pod 80b. Each power pod 80 may include a rectifier 82, such as a three-phase diode rectifier bridge, a direct current (DC) link 84, and an inverter 86. Specifically, the first power pod 80a may include a first rectifier 82a, a first DC link 84a, and a first inverter 86*a* and the second power pod 80*b* may include a second rectifier 82*b*, a second DC link 84*b*, and a second inverter 86*b*.

In the illustrated embodiment, the VSD 52 may receive one or more electrical signals from a microprocessor 88. In some embodiments, the microprocessor 88 may be a logic board (e.g., a printed circuit board, an integrated circuit, etc.) having one or more processing units. In certain embodiments, the microprocessor 88 may be an embodiment of the microprocessor 44 (FIGS. 3 and 4). The microprocessor 88 may utilize pulse-width modulation (PWM) to supply one or more electrical signals representative of an AC voltage to the first and second inverters 86*a*, 86*b*. In some embodiments, the microprocessor 88 produce a set of electrical signals via a single path 91 (e.g., wire, connector, wireless transmission, etc.) that is then split and routed to each of the first inverter 86*a* and the second inverter 86*b*. In this manner, the first power pod 80*a* may receive the same electrical signal as the second power pod 80*b* via the first inverter 86*a* and the second inverter 86*b*, respectively.

Further, in the current embodiment, the VSD 52 may receive power from a power source 89. The power source 89 may be any suitable power source such as a generator, an electrical grid, solar panels, batteries, etc. In some embodiments, the VSD 52 may receive electrical signals from two separate microprocessors 88. Indeed, in such embodiments, the separate microprocessors 88 may be synced such that the separate microprocessors 88 supply electrical signals to respective inverters 82 that are substantially the same.

The rectifiers 82 may receive AC voltage from the power source 89. The rectifiers 82 may be full-wave bridge rectifiers that may convert, or smooth-out, the AC voltage to DC voltage. Particularly, in some embodiments, the rectifiers 82 may include components such as diodes, silicon-controlled rectifiers (SCRs), insulated gate bipolar transistors (IGBTs), thyristors, or any combination thereof coupled together in a full-wave bridge configuration to convert the AC voltage to DC voltage. In some embodiments, the rectifiers 82 may also receive one or more PWM signals from the microprocessor 88.

The DC links 84 may then receive the DC voltage from respective rectifiers 82 and supply the DC voltage to the respective inverters 86. Particularly, the DC links 84 may include one or more inductors and/or capacitors, which may be utilized to further filter out variations, or smooth-out, the current and/or voltage received from the rectifier 82. The DC links 84 may also be utilized to prevent transients passing from the inverters 86 back to the rectifiers 82.

The inverters 86 may receive the DC voltage from the respective DC links 84 and convert the DC voltage into AC voltage with a suitable voltage and frequency. Additionally, as mentioned above, the inverters 86 may also receive a PWM signal from the microprocessor 88. The inverter 86 may then output a sinusoidal current using pulsed DC bus voltage, or pulse-width modulation (PWM). For example, the inverter 86 may be composed of semiconductor devices such as insulated gate bipolar transistors (IGBTs) to convert the DC voltage to AC voltage. Each inverter 86 may then supply a three-phase current to the motor 50. Particularly, each inverter 86 may include three separate wires 90, or connections, together each supplying a voltage waveform that may be approximately 120 degrees offset relative to one another.

The power pods 80 may each supply the three-phase current to the motor 50 in a delta configuration, as illustrated in FIG. 5. In some embodiments, the power pods 80 may each supply the three-phase current to the motor 50 in a wye configuration. For example, each wire 90 may supply its individual phase at respective vertices of a triangular coupling of windings. Specifically, each power pod 80 may supply power to electrically insulated windings disposed about a stator of the motor 50. In this manner, the VSD 52 may supply a suitable voltage and current to the windings of the motor 50, which may induce a rotating magnetic field. A rotor, or shaft, of the motor 50 may interact with the magnetic field, such as through conductors disposed within the rotor, which in turn may generate forces to rotate the rotor.

For example, the motor 50 may include a first winding 92 in a delta configuration and a second winding 94 that is also in a delta configuration. Indeed, both of the first winding 92 and the second winding 94 may be disposed within the same slots within the stator of the motor 50. However, although the first winding 92 and the second winding 94 may be disposed adjacent to one another, the first winding 92 and the second winding 94 may be galvanically isolated from one another. In other words, electric current may not flow between the first winding 92 and the second winding 94, and there may be no direct conduction path between the first winding 92 and the second winding 94. However, energy and/or information may still be exchanged between the first winding 92 and the second winding 94 such as through capacitance, induction, electromagnetic waves, optics, acoustics, etc. That is, the first winding 92 and the second winding 94 may not be shorted together.

Indeed, the first power pod 80*a* feeding power to the first winding 92 may operate/function independently of the second power pod 80*b* feeding power to the second winding 94. That is, each power pod 80 may supply half of the power (e.g., voltage and current) used for the motor 50 to operate at its designed total output. Particularly, one power pod 80 (e.g., either the first power pod 80*a* or the second power pod 80*b*) may not supply power to the motor 50 while the other power pod 80 continues to supply power to the motor 50. Therefore, the motor 50 may continue to operate to some degree, such as approximately half of its full standard output, if one of the power pods 80 discontinues its supply of power to its respective winding (e.g., either the first winding 92 or the second winding 94). To illustrate, a shaft, or rotor, of the motor 50 may operate at a first speed and torque while being supplied power from the first power pod 80*a* and the second power pod 80*b*. If one of the power pods 80 discontinues its supply of power to the motor 50, the shaft, or rotor, of the motor 50 may continue to operate at a second speed and torque, which may correspond to approximately half of the power associated with the first speed and torque.

In some embodiments, a single rectifier may receive a set of signals (e.g., AC voltage) from the microprocessor 88 and/or AC voltage from the power source 89 as input AC voltage. The single rectifier 82 may then rectify the input AC voltage to DC voltage and supply the DC voltage to a single DC link 84. The single DC link 84 may then route the DC voltage separately to both of the first inverter 86*a* and the second inverter 86*b*. Further, due at least to the duplicity of the first power pod 80*a* and the second power pod 80*b*, the three-phase power supply output of each of the first inverter 86*a* and the second inverter 86*b* may substantially match each other. That is, the first windings 92 and the second windings 94 may each receive AC voltage having substantially the same frequency, voltage, and current.

Further, the VSD 52 as disclosed herein may be utilized with any suitable size of motor 50 that has two sets of windings insulated, or galvanically isolated, from one other.

For example in some embodiments, the motor 50 may be configured to have an output of approximately 800 horsepower, 900 horsepower, 1000 horsepower, 1100 horsepower, 1200 horsepower, 1250 horsepower, 1280 horsepower, 1300 horsepower, between 1200 and 1300 horsepower, greater than 1300 horsepower, or any other suitable output.

Accordingly, the present disclosure is directed to providing systems and methods of a variable speed drive (VSD) having two independently operating power pods. For example, each power pod may receive a set of electrical signals from a microprocessor. Specifically, the microprocessor may output a single set of electrical signals, which may be a pulse-width modulation (PWM) control signal that is routed to an inverter in each power pod. Further, each power pod may receive AC voltage from a power source via a rectifier, which may convert the AC voltage to the DC voltage. Each power pod may then receive the DC voltage from their respective rectifiers via respective DC links. The respective DC links may then feed the DC voltage to respective inverters. The respective inverters may then convert the DC voltage to a three-phase AC voltage supply. The inverters may then send three-phase AC voltage supply to respective galvanically isolated, or electrically insulated, windings of a motor. Indeed, in some embodiments, the three-phase AC voltage supply may be based on input from the microprocessor and/or input from respective DC links. In this manner, the VSD may supply power to large motors, such as motors rated for greater than a 1200 horsepower output while utilizing manageable components. Particularly, in certain instances, a VSD with a single power pod may utilize cumbersomely sized wires and other components, thereby incurring excessive production costs. Further, the duplicity of the power pods in the current embodiments, may provide for the motor to continue operation if one of the power pods discontinues operation. Indeed, each power pod may operate independently of the other. Further, the reduced power output of each power pod to operate the motor may increase the longevity of the components within the VSD. Moreover, it should be noted that the embodiments discussed herein utilizing the two independently operating power pods may be utilized with any suitable motor, such as existing motors manufactured to include two sets of electrically isolated windings.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, air conditioning, and refrigeration (HVAC&R) system, comprising:
   a refrigerant loop;
   a compressor disposed along the refrigerant loop, wherein the compressor is configured to circulate refrigerant through the refrigerant loop;
   a motor configured to drive the compressor; and
   a variable speed drive (VSD) configured to supply power to the motor, wherein the VSD comprises:
      a first power pod configured to supply a first power to the motor; and
      a second power pod configured to supply a second power to the motor, wherein the first power pod and the second power pod are configured to operate independently of one another such that one of the first or second power pods is configured to operate while operation of another of the first or second power pods is discontinued.

2. The HVAC&R system of claim 1, wherein the first power pod comprises a first rectifier, a first direct current (DC) link, and a first inverter, and the second power pod comprises a second rectifier, a second DC link, and a second inverter.

3. The HVAC&R system of claim 1, wherein the motor is configured to receive the first power via first electrical windings and to receive the second power via second electrical windings.

4. The HVAC&R system of claim 3, wherein the first electrical windings are insulated from the second electrical windings.

5. The HVAC&R system of claim 3, wherein the motor comprises a rotor and a stator, wherein the rotor comprises a set of slots, and wherein the first electrical windings are disposed within the set of slots and the second electrical windings are disposed within the set of slots.

6. The HVAC&R system of claim 3, wherein the first electrical windings are in a first delta configuration, wherein the second electrical windings are in a second delta configuration, and wherein the first delta configuration of the first electrical windings is galvanically isolated from the second delta configuration of the second electrical windings.

7. The HVAC&R system of claim 1, comprising a microprocessor, wherein the microprocessor is configured to output a set of electrical signals, wherein the first power pod is configured to receive the set of electrical signals, and wherein the second power pod is configured to receive the set of electrical signals.

8. The HVAC&R system of claim 1, wherein the motor is configured to provide at least 1200 horsepower as input to the compressor.

9. A method, comprising:
   receiving a set of electrical signals via a first power pod of a variable speed drive;
   receiving the set of electrical signals via a second power pod of the variable speed drive;
   supplying a first voltage to first windings of a motor via the first power pod; and
   supplying a second voltage to second windings of the motor via the second power pod, wherein the first and second power pods are configured to operate independently of one another such that one of the first or second power pods is configured to operate while operation of another of the first or second power pods is discontinued.

10. The method of claim 9, comprising electrically insulating the first windings from the second windings.

11. The method of claim 9, wherein the first power pod and the second power pod are configured to receive the set of electrical signals from a microprocessor, and wherein the microprocessor is configured to produce the set of electrical signals via pulse-width modulation.

12. The method of claim 9, wherein the first power pod is configured to receive the set of electrical signals via a first inverter and the second power pod is configured to receive the set of electrical signals via a second inverter, wherein the first inverter is configured to supply the first voltage to the first windings based at least in part on the set of electrical signals, wherein the second inverter is configured to supply the second voltage to the second windings based at least in part on the set of electrical signals.

13. The method of claim 9, wherein the first power pod comprises a first rectifier configured to receive a first alternating current (AC) voltage from a power source and convert the first AC voltage to a first direct current (DC) voltage, wherein the second power pod comprises a second rectifier configured to receive a second AC voltage from the power source and convert the second AC voltage to a second DC voltage, wherein a first DC link of the first power pod is configured to receive the first DC voltage from the first rectifier, and wherein a second DC link of the second power pod is configured to receive the second DC voltage from the second rectifier.

14. The method of claim 13, wherein a first inverter of the first power pod is configured to receive the first DC voltage from the first DC link, convert the first DC voltage to the first AC voltage, and supply the first AC voltage to the first windings, and wherein a second inverter of the second power pod is configured to receive the second DC voltage from the second DC link, convert the second DC voltage to the second AC voltage, and supply the second AC voltage to the second windings.

15. The method of claim 9, wherein the first windings are electrically insulated from the second windings.

16. A system, comprising:
a microcontroller;
a variable speed drive (VSD) configured to receive a set of electrical signals from the microcontroller, wherein the VSD comprises a first power pod configured to provide a first power supply and a second power pod configured to provide a second power supply, wherein the first power pod and the second power pod are configured to operate independently of one another such that one of the first or second power pods is configured to operate while operation of another of the first or second power pods is discontinued; and
a motor configured to receive the first power supply and the second power supply from the VSD via first windings and second windings, respectively.

17. The system of claim 16, wherein the VSD comprises a first rectifier, a first direct current (DC) link, a first inverter, a second rectifier, a second DC link, and a second inverter.

18. The system of claim 16, wherein the first and second windings are galvanically isolated from one another.

* * * * *